US010698505B2

(12) United States Patent
Nuber et al.

(10) Patent No.: US 10,698,505 B2
(45) Date of Patent: Jun. 30, 2020

(54) EXECUTING MULTIPLE PEN INPUTS (71) Applicant: HEWLETT-PACKARD DEVELOPMENT COMPANY, L.P., Houston, TX (US)

(72) Inventors: Nathan Barr Nuber, Fort Collins, CO (US); Peter Christian Peterson, Fort Collins, CO (US)

(73) Assignee: Hewlett-Packard Development Company, L.P., Spring, TX (US)

(*) Notice: Subject to any disclaimer, the term of this patent is extended or adjusted under 35 U.S.C. 154(b) by 62 days.

(21) Appl. No.: 15/748,991

(22) PCT Filed: Jan. 13, 2016

(86) PCT No.: PCT/US2016/013186
§ 371 (c)(1),
(2) Date: Jan. 30, 2018

(87) PCT Pub. No.: WO2017/123215
PCT Pub. Date: Jul. 20, 2017

(65) Prior Publication Data
US 2019/0004621 A1 Jan. 3, 2019

(51) Int. Cl.
*G06F 3/0354* (2013.01)
*G06F 3/038* (2013.01)
(Continued)

(52) U.S. Cl.
CPC .......... *G06F 3/03545* (2013.01); *G06F 3/038* (2013.01); *G06F 3/041* (2013.01);
(Continued)

(58) Field of Classification Search
CPC ... G06F 2203/0382; G06F 2203/04104; G06F 3/03545; G06F 3/038; G06F 3/041; G06F 9/451; G06F 9/54
See application file for complete search history.

(56) References Cited

U.S. PATENT DOCUMENTS 8,788,950 B2  7/2014  Ivashin
2007/0226636 A1  9/2007  Carpenter et al.
(Continued)

FOREIGN PATENT DOCUMENTS

EP  2747024  6/2014
WO  WO-2013043702 A1  3/2013
WO  WO-2014178800 A1  11/2014

OTHER PUBLICATIONS

Likness ~ "Working with User Input Devices in the Windows Runtime" ~ http://www.informit.com ~ Jul. 17, 2014 ~ 7 pages.
(Continued)

*Primary Examiner* — Hong Zhou
(74) *Attorney, Agent, or Firm* — HP Inc. Patent Department (57) ABSTRACT

In example implementations, a method executed by a processor is provided. The method receives a first pen input from first pen and a second pen input from a second pen. The first pen and the second pen interact with a single display. The first pen input and the second pen input are translated into a first output and a second output, respectively, that are executed by an application. The first output and the second output are sent to the application. The application executes the first output and the second output simultaneously.

19 Claims, 6 Drawing Sheets (51) Int. Cl.
  *G06F 3/041* (2006.01)
  *G06F 9/451* (2018.01)
  *G06F 9/54* (2006.01)
(52) U.S. Cl.
  CPC ............... *G06F 9/451* (2018.02); *G06F 9/54* (2013.01); *G06F 2203/0382* (2013.01); *G06F 2203/04104* (2013.01)

(56) References Cited

U.S. PATENT DOCUMENTS

| | | | |
|---|---|---|---|
| 2008/0169132 A1 | 7/2008 | Ding et al. | |
| 2009/0322701 A1 | 12/2009 | D'Souza et al. | |
| 2010/0211902 A1* | 8/2010 | Unsworth | G06F 3/03545 715/769 |
| 2012/0262407 A1 | 10/2012 | Hinckley et al. | |
| 2013/0088464 A1 | 4/2013 | Pearce | |
| 2013/0113762 A1 | 5/2013 | Geaghan | |
| 2013/0162538 A1 | 6/2013 | Ichieda | |
| 2013/0212489 A1 | 8/2013 | Ivashin et al. | |
| 2014/0028576 A1* | 1/2014 | Shahparnia | G06F 3/0416 345/173 |
| 2014/0043286 A1* | 2/2014 | Lee | G06F 3/03545 345/174 |
| 2014/0075372 A1* | 3/2014 | Wu | G06F 3/038 715/781 |
| 2014/0157128 A1 | 6/2014 | Hussain et al. | |
| 2015/0153850 A1* | 6/2015 | Fujii | G06F 3/03545 345/173 |
| 2015/0277745 A1* | 10/2015 | Qian | G06F 16/532 715/863 |
| 2015/0301661 A1 | 10/2015 | Leigh et al. | |
| 2016/0195975 A1* | 7/2016 | Baum | G06F 3/0416 345/174 |
| 2016/0291788 A1* | 10/2016 | Johansson | G06F 3/0488 |

OTHER PUBLICATIONS

Xin et al ~ "Acquiring and Pointing: an Empirical Study of Pen-tilt-based Interaction" ~ CHI 2011 ~ May 2011 ~ 10 pages.
International Searching Authority., International Search Report and Written Opinion dated Sep. 26, 2016 for PCT Application No. PCT/US2016/013186 Filed Jan. 13, 2016, 11 pgs.

* cited by examiner

EXECUTING MULTIPLE PEN INPUTS

BACKGROUND

Pen-based inputs are becoming more ubiquitous. Pen input enables a more natural, intuitive form of input when compared to the traditional computer mouse. For example, a pen input allows a user to freely draw and write on a display as a user would with a pen and paper.

DETAILED DESCRIPTION

The present disclosure discloses an example apparatus and method for executing multiple pen inputs. For example, current devices process a single pen input. For example, if multiple pens attempt to provide an input on the device, a single pen input is accepted while the rest are filtered out and the output of the single accepted pen input is executed by an application. Typically, the single pen input that is not filtered out is the first pen that is detected. In other words, not all of the pen inputs are translated into outputs that can be executed by the application simultaneously.

In contrast, the present disclosure maintains separate data streams for each pen input to allow each pen input to be processed and executed by the application on the device simultaneously.

Figure 1:
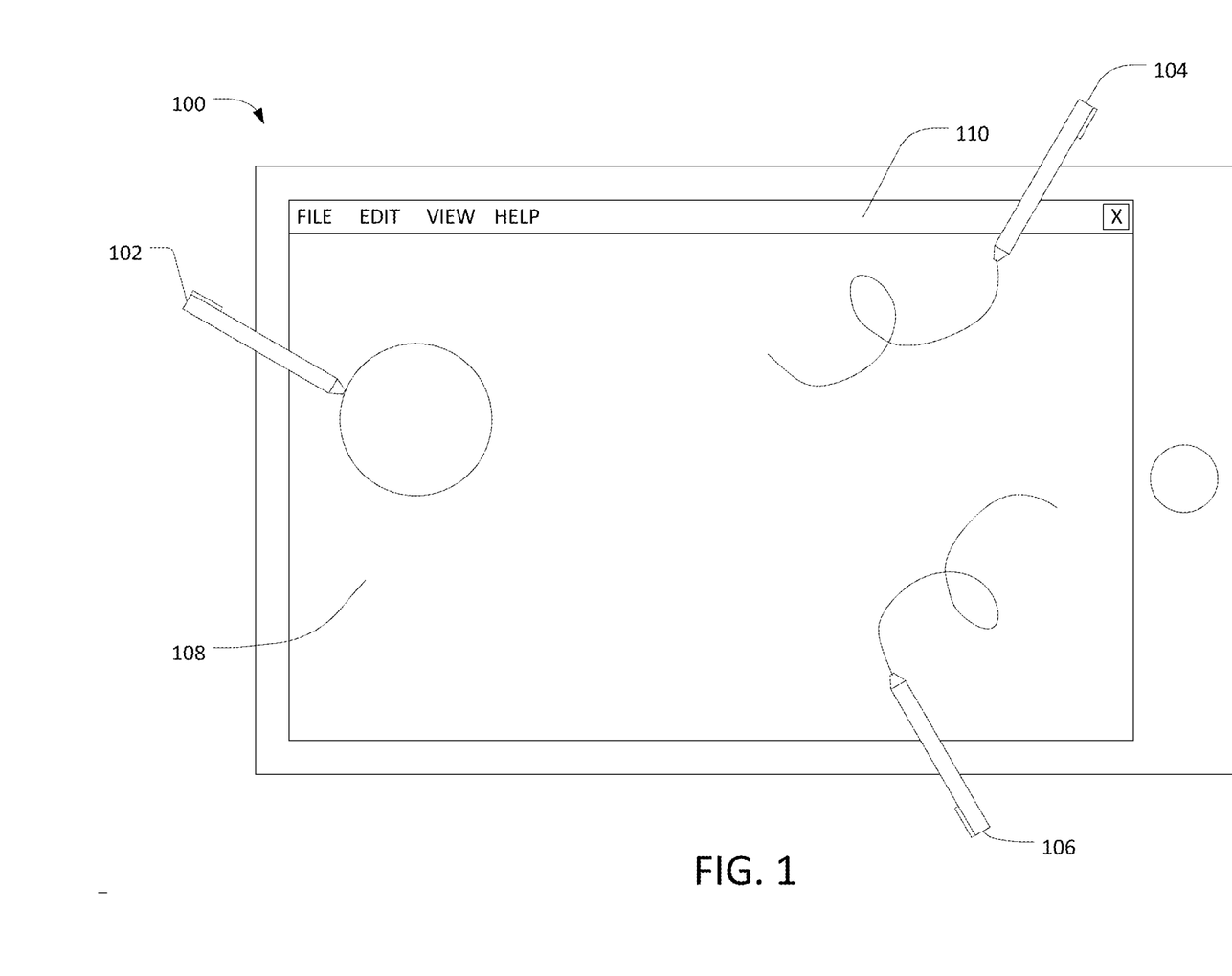
FIG. 1 is a block diagram of an example device of the present disclosure.

FIG. 1 illustrates an example apparatus 100 of the present disclosure. In one example, the apparatus 100 may include a device 100 having a display 108. Examples of the device 100 may include a tablet computer, a lap top computer, and the like.

The device 100 may be an apparatus containing a processor and memory. For example, the memory may include instructions associated with an application 110 that is executed by the processor. The application 110 may be an application that receives pen inputs (also referred to as human interface device (HID) events, a device input, and the like) to execute a command.

For example, a plurality of input devices 102, 104 and 106 may provide a device or pen input. Although three input devices 102, 104 and 106 are illustrated in FIG. 1, it should be noted that any number of input devices may be deployed. The input devices 102, 104 and 106 may be any type of input device such as an electro-mechanical pen device (e.g., a smart pen that communicates with the device 100 over a short range wireless connection such as Bluetooth®), a mechanical input device (e.g., a stylus pen), and the like.

In one example, the plurality of input devices 102, 104 and 106 may interact with a single display 108 to each provide device or pen input. In one example, the plurality of input devices 102, 104 and 106 are electro-mechanical devices and the display 108 is not a touch screen display. As a result, the plurality of input devices 102, 104 and 106 may each serve as interfaces for receiving the pen inputs for the application 110.

In another example, the display 108 may be a touch screen display. As a result, the plurality of input devices 102, 104 and 106 may be mechanical input devices (e.g., a stylus pen). The display 108 acts as the interface for receiving the pen inputs for the application 110.

As noted above, some devices process a single pen input. In other words, some devices filter out additional pen inputs when multiple pen inputs are detected such that a single pen input is processed. However, the example implementations of the present disclosure allow multiple pen inputs to be received and processed by the device 100. For example, the device 100 may be modified to maintain separate pen input data streams, rather than multiplexing the input data streams as done by some devices. As a result, each pen input associated with each input devices 102, 104 and 106 may be separately identified and processed by the device 100.

Said another way, the input devices 102, 104 and 106 may provide a pen input simultaneously or at the same time. The device 100 of the present disclosure may receive the pen inputs, translate the pen inputs into commands for the application 110 and execute commands associated with a respective input device 102, 104 and 106 simultaneously.

It should be noted that the pen inputs provided by the input devices 102, 104 and 106 are independent of one another. In other words, the pen inputs are not part of a single command (e.g., using two fingers for a zoom in or zoom out command, and the like). Rather, the input devices 102, 104 and 106 may be controlled by different individuals who are providing his or her own unique or independent pen input on a single device 100. For example, the individuals may be collaborating on a design or project that is displayed on the display 108 of the device 100 using separate input devices 102, 104 and 106.

Figure 2:
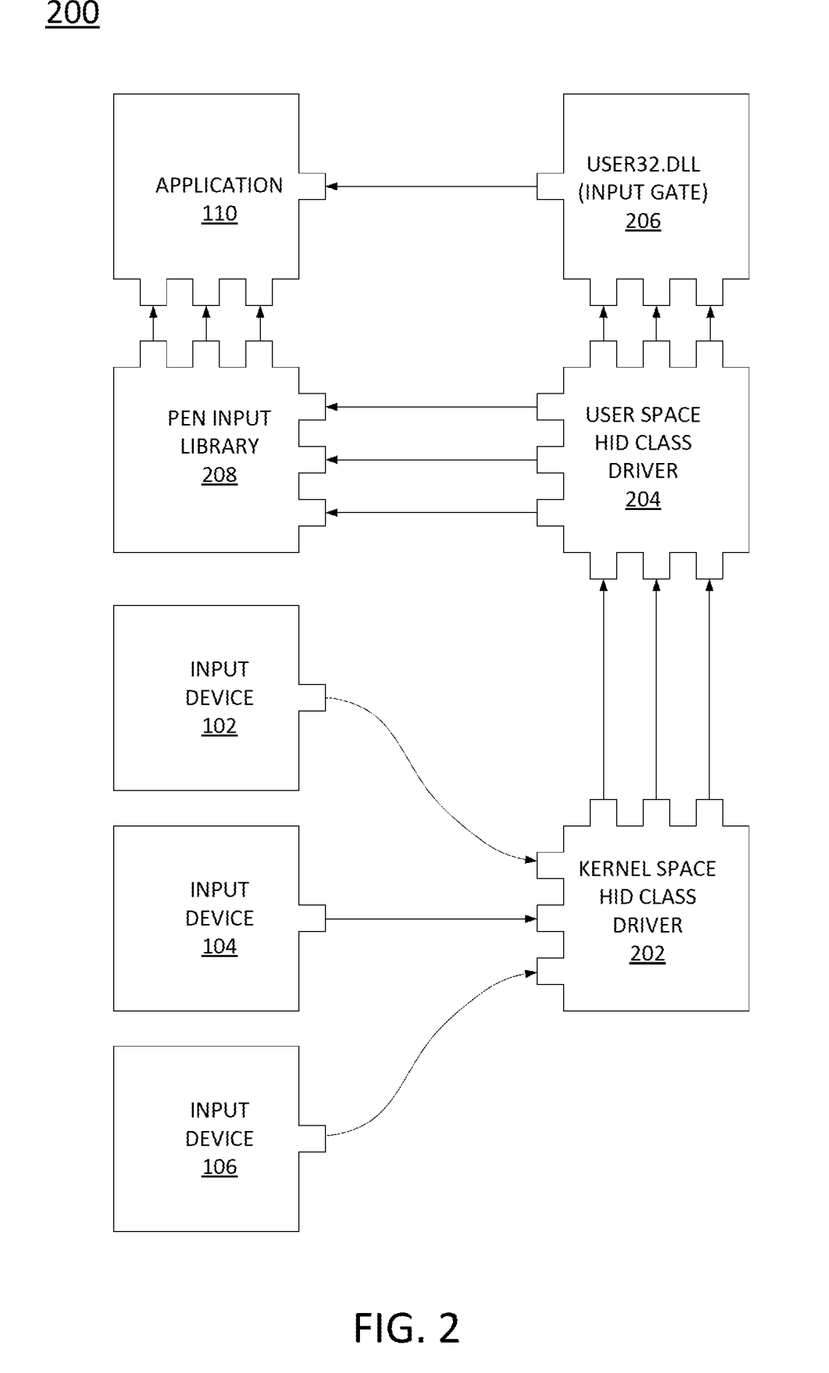
FIG. 2 is a block diagram of an example apparatus of the present disclosure.

FIG. 2 illustrates a block diagram 200 of the example device 100 of the present disclosure. In one example, the device 100 may include a kernel space HID class driver 202 that receives the HID events (e.g., pen inputs) from the input devices 102, 104 and 106. In one example, the HID events may include information such as location of the input devices 102, 104 and 106 on the display 108 (e.g., x-y coordinates), tilt angle, pressure, azimuth, and the like. As noted above, the HID events may be received from the input devices 102, 104 and 106 via a short range wireless connection if the input devices 102, 104, and 106 are electro-mechanical input devices or the HID events may be received via a touch screen display of the device.

The kernel space HID class driver 202 may be located within the operating system (OS) of the device 100. The kernel space HID class driver 202 may receive the raw inputs of the input devices 102, 104 and 106.

The kernel space HID class driver 202 may be in communication with a user space HID class driver 204. The user space HID class driver 204 may be located in the user space where the application 110 is run. The user space may be separate from the kernel space that executes the OS. The user space HID class driver 204 provides functionality as part of the operating system to allow components (e.g., a pen input library 208 or a User32.dll 206) to understand the HID data coming from the kernel space. The HID events (e.g., the plurality of pen inputs) may be forwarded from the kernel space HID class driver 202 to the user space HID class driver 204.

In one example, the User32.dll may make the HID events available to the pen input library 208. For example, a notification can be sent to the pen input library 208 indicating that the HID events are available. In response to the notification, the pen input library 208 can make API calls that result in the plurality of pen inputs being forwarded from the user space HID class driver 204 to the pen input library 208 via the OS of the device 100. The pen input library 208 may be a dynamic link library (.dll) file that that can maintain separate HID event streams for each input device 102, 104 and 106 and provide a translation of the HID events into a command that is formatted such that the application 110 can understand the commands.

In other words, the pen input library 208 does not multiplex or filter out HID events as done by a User32.dll 206. Rather, the pen input library 208 may identify each input device 102, 104 and 106, associate each HID event with one of the input devices 102, 104 and 106 and translate each HID event into a command that is executed by the application 110.

In one implementation, each HID event may cause the pen input library 208 to make a call to a Windows® application programming interface (API) to translate the HID event into a command. The pen input library 208 may receive the HID event, format the HID event into a command, and then forward the command to the application 110 for execution. The pen input library 208 may continuously receive the HID events from the plurality of input devices 102, 104 and 106 and continuously perform the functions described above.

In one example, the pen input library 208 may be part of the application 110. For example, when the application 110 is loaded into the memory of the device 100, the pen input library 208 may also be loaded into the memory of the device 100. In another example, the pen input library 208 may be part of the user space and saved in the memory of the device 100 and shared by the application 110 and other applications. In other words, the pen input library 208 may be accessed externally by the application 110.

In one example, the user space HID class driver 204 may also be in communication with the User32.dll 206. The User32.dll 206 may receive HID events from the user space HID class driver 204, format the HID event into a command, and then forward the command to the application 110 for execution. However, the application 110 may be modified to execute commands from the pen input library 208 and ignore commands from the User32.dll.

Figure 3:
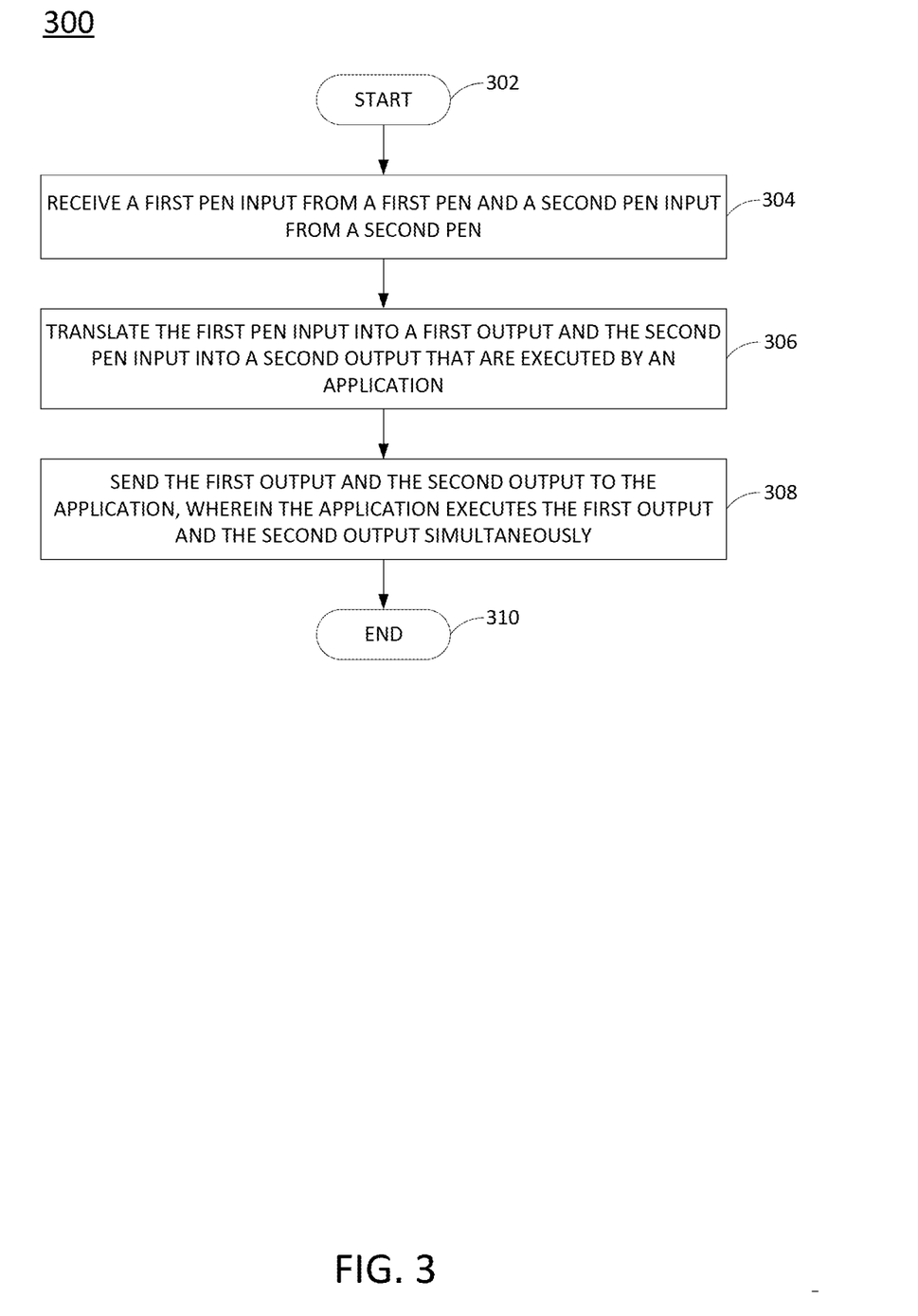
FIG. 3 is a flow diagram of an example method for executing multiple pen inputs.

FIG. 3 illustrates a flow diagram of an example method 300 for executing multiple pen inputs. In one example, the blocks of the method 300 may be performed by the apparatus 100.

At block 302, the method 300 begins. At block 304, the method 300 receives a first pen input from a first pen and a second pen input from a second pen. In one example, the method may receive a plurality of pen inputs (e.g., two or more). The first pen input and the second pen input may be received via a respective electro-mechanical pen device that interacts with a single display of a device via a short range wireless connection (e.g., Bluetooth®). Each one of the electro-mechanical pen devices may serve as an interface for an application running on the device that uses the first pen and the second pen.

In another example, the first pen input and the second pen input may be received via a single touch screen display of the device. For example, a plurality of mechanical input devices (e.g., stylus pens) may provide independent pen inputs on a touchscreen of the device.

In one example, the pen inputs may be buffered. Thus, the method 300 may process each pen input as they are received via the single interface or display.

At block 306, the method 300 translates the first pen input into a first output and the second pen input into a second output that are executed by an application. In one example, the pen inputs may be received as raw inputs of a HID event via a kernel space HID class driver. The kernel space HID class driver may then provide the pen inputs to a user space HID class driver in the user space of the device.

The user space HID class driver may be used by the operating system to provide the pen inputs to a pen input library. The pen input library may maintain a separate data stream for each one of the plurality of input devices. Each one of the pen inputs may be associated with a respective input device. The pen input library may make a Windows® API call to translate the pen inputs into the output (e.g., a command) that is executed by the application. In one example, the pen input library may format the command such that the command is understandable by the application.

At block 308, the method 300 sends the first output and the second output to the application, wherein the application executes the first output and the second output simultaneously. In other words, each output (e.g., a command) may be executed by the application being executed by the device. For example, a first input device may be drawing a circle in a first location of the display, a second input device may be writing text in a second location of the display, and a third input device may be writing text in a third location of the display. Previous devices would filter out any additional pen input received during the drawing of the circle by the first input device. However, the present disclosure would allow the pen input library to maintain separate data streams such that the application may show a circle drawn by the first input device, the text written by the second input device and the text written by the third input device simultaneously, or at the same time at different locations of the display. At block 310, the method 300 ends.

Figure 4:
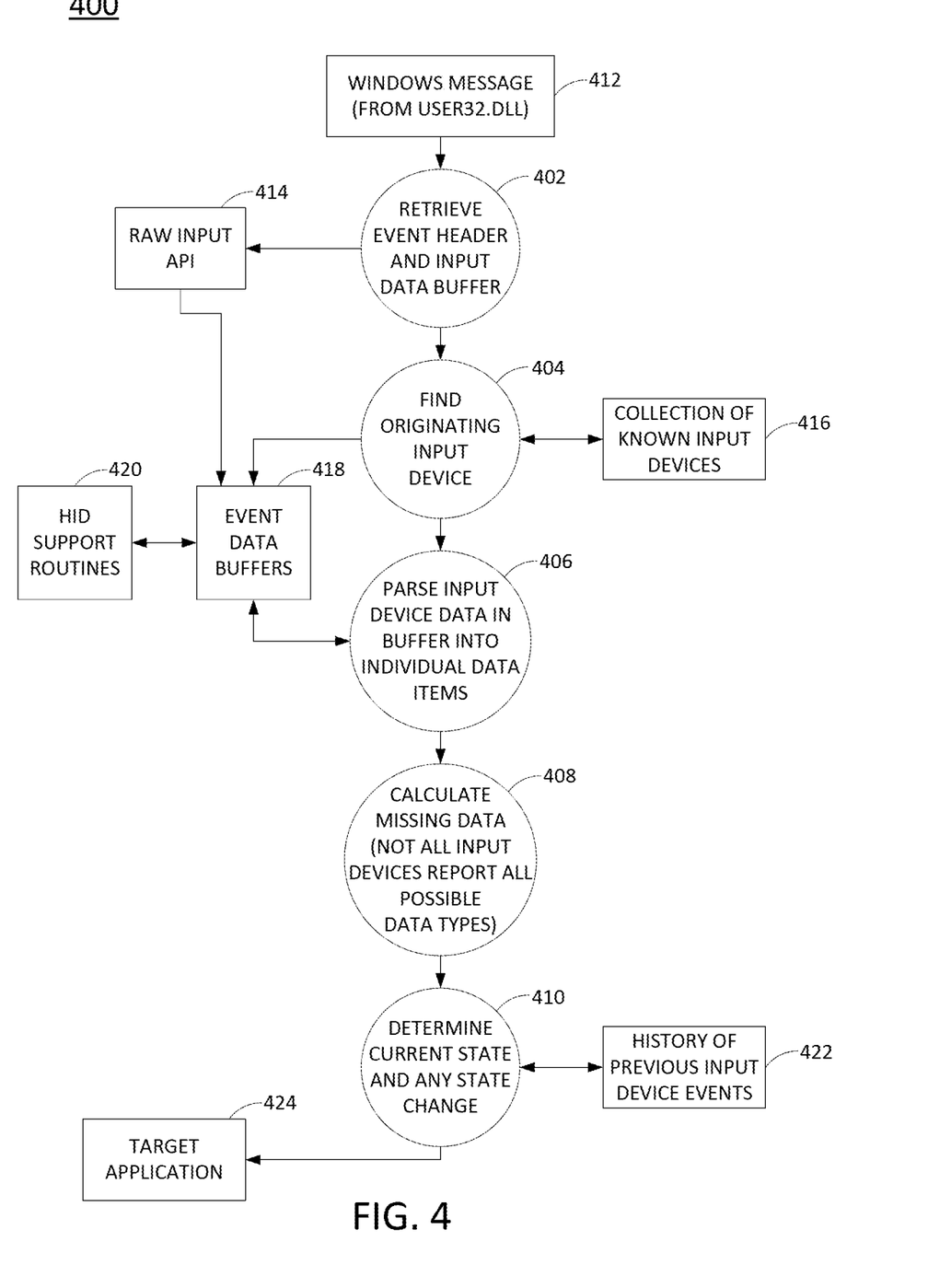
FIG. 4 is another flow diagram of an example method for executing multiple pen inputs.

FIG. 4 illustrates a flow diagram of an example method 400 for executing multiple device or pen inputs. In one example, the blocks of the method 400 may be performed by the pen input library 208. In one example, blocks 402, 404, 406, 408 and 410, illustrated as circles, may represent blocks that are executed. The blocks 412, 414, 418, 420, and 424, illustrated as rectangles, may represent sources of data that are external to pen input library 208. The blocks 416 and 422, illustrated as rectangles, may represent sources of data that are internal to the pen input library 208. The sources of data may be used as an input or output for a block 402, 404, 406, 408 and 410 that is executed by the pen input library 208. In other words, blocks 412, 414, 416, 418, 420, 422 and 424 represent data or things and not blocks that are executed by the pen input library 208.

At block 402, the method 400 may retrieve an event header and input data buffer (also referred to as an event data buffer). In one example, in the present disclosure an event data buffer may be composed of a header buffer and an input buffer. The header buffer may describe the originating input device of the event and provide meta-data to allow for processing of the input buffer. The input buffer may contain relevant data associated with the event (e.g., x-y data, pressure, tilt, and the like).

In one example, the method 400 may receive windows messages 412 from the User32.dll through a Windows® event loop. In another example, the pen input library may install a hook into the message queue and get first access to the messages. The Windows® messages 412 may indicate that an HID event is ready to be retrieved through a subsequent Windows® API call.

At block 402, the event header and the input data buffer may be retrieved. For example, the pen input library may invoke methods in a raw input API 414 to retrieve the header data buffer and input data buffer, collectively called the event data buffers 418. The event data buffers 418 may be accessed by the pen input library to perform various additional functions.

At block 404, the method 400 may find an originating input device. For example, some of the input devices may have already been identified from earlier pen inputs that were sent from the input devices. A collection of known input devices 416 may be stored in memory. Known input devices may be located during execution of block 404 and correlated to data in the event data buffers 418. However, if the originating input device has not been previously identified and stored in the collection of known input devices 416, the originating input device may be identified based on data from the raw input API 414 and data from HID class support routines 420. A newly identified input device may then be stored in the collection of known input devices 416.

At block 406, the method 400 parses the pen input data in an event data buffer 418 into individual data items. The event data buffer 418 may be used in conjunction with the HID class support routines 420 to interpret the data being delivered by the input devices. For example, the meaning of the input data buffer that is received as binary data may now be identified as data such as x position, y position, pressure, tilt, rotation, button presses, and the like.

At block 408, the method 400 calculates missing data. For example, an input device may not deliver all the data that is used to provide a particular command. For example, the input device may deliver information about x-tilt and y-tilt of the input device (e.g., how far the input device is leaning left-right and forward-backward), but the input device may not deliver the azimuth (e.g., the input device's orientation relative to the display). In one example, the missing data may be calculated using trigonometry.

At block 410, the method 400 determines a current state and any state change. For example, a pen input may represent a change in state. The input device is moved, lifted, pressed down, or changed in some way for the input device hardware to deliver pen inputs into the input buffer. At block 410, the previous state of the input device may be compared to the current state to determine the command that is translated with the pen input.

For example, the pen input library may keep a copy of, or store a table of, a history of previous input device events 422 for each input device so that the previous state can be compared to the current state to identify the state change. Table 1 below provides non-limiting examples of previous states and state changes:

TABLE 1

PREVIOUS STATE AND STATE CHANGES

| PREVIOUS STATE | STATE CHANGE |
| --- | --- |
| Unknown (an initial state) | |
| Not Present | Leave (e.g., go into Not Present state) |
| Present (hovering) | Enter (go into Present state) |
| Down (writing) | Down (go into Down state) |
| | Up (go from Down to Present state) |
| | Move (was in Down, still in Down state) |
| | Button or Value (Minor change in data, no state change) |

Based on the comparison of the previous state and the current state, the change in state may be identified. The change in state may determine the command associated with the pen input. The pen input library may format the commands such that the commands are understood by the application. The commands may be sent to the target application 424 to be executed simultaneously or in parallel.

In one example, the method 400 may be executed continuously as a plurality of different input devices are providing a plurality of different or independent pen inputs. As a result, the method 400 may allow different input devices to provide different pen inputs for a single application on a single interface or display.

Figure 5:
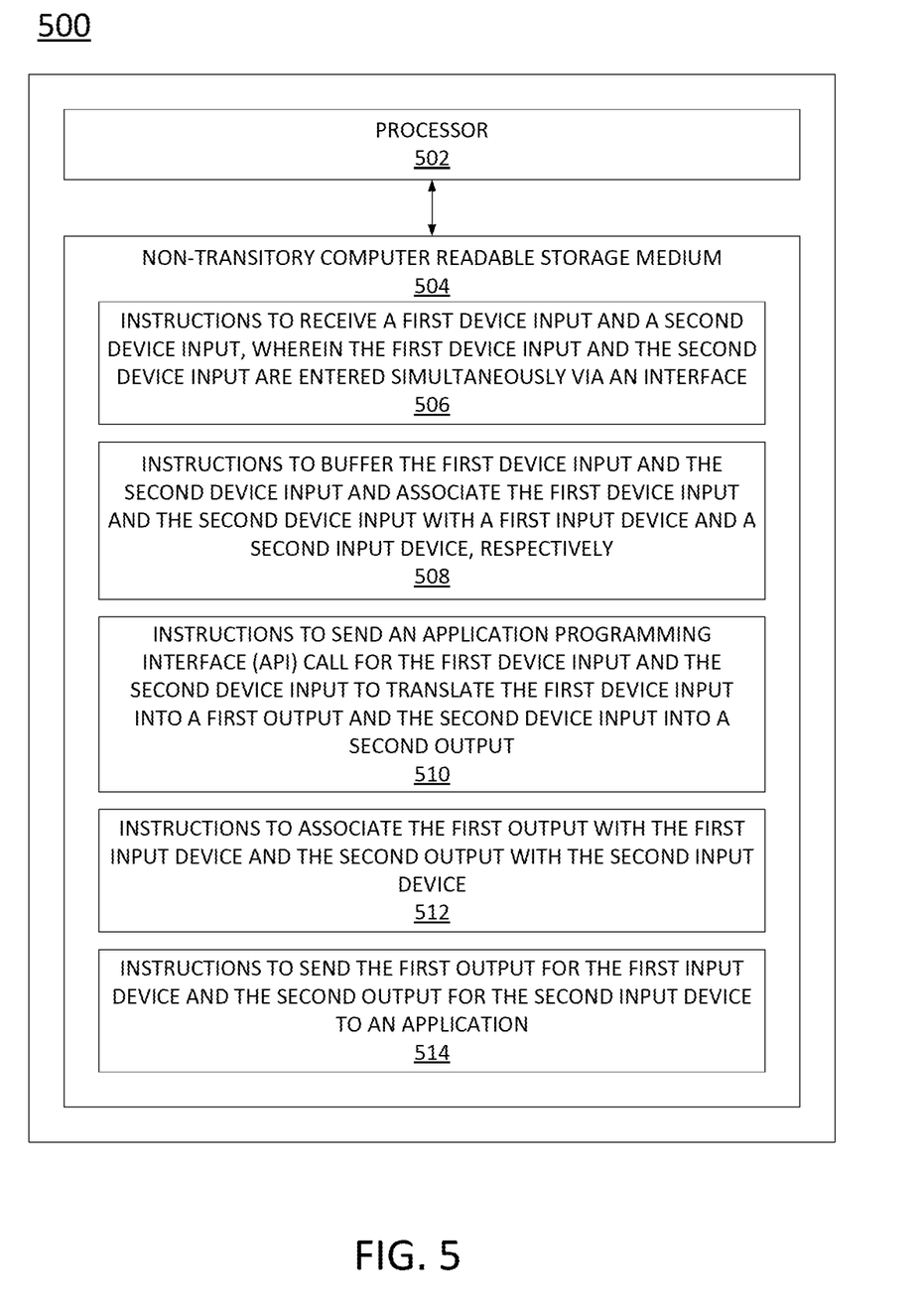
FIG. 5 is a block diagram of another example apparatus of the present disclosure.

FIG. 5 illustrates an example of an apparatus 500. In one example, the apparatus may be the device 100. In one example, the apparatus 500 may include a processor 502 and a non-transitory computer readable storage medium 504. The non-transitory computer readable storage medium 504 may include instructions 506, 508, 510, 512 and 514 that when executed by the processor 502, cause the processor 502 to perform various functions.

In one example, the instructions 506 may include instructions to receive a first device input and a second device input, wherein the first device input and the second device input are entered simultaneously via an interface. The instructions 508 may include instructions to buffer the first device input and the second device input and associate the first device input and the second device input with a first input device and a second input device, respectively. The instructions 510 may include instructions to send an application programming interface (API) call for the first device input and the second device input to translate the first device input into a first output and the second device input into a second output. The instructions 512 may include instructions to associate the first output with the first input device and the second output with the second input device. The instructions 514 may include instructions to send the first output for the first input device and the second output for the second input device to an application.

Figure 6:
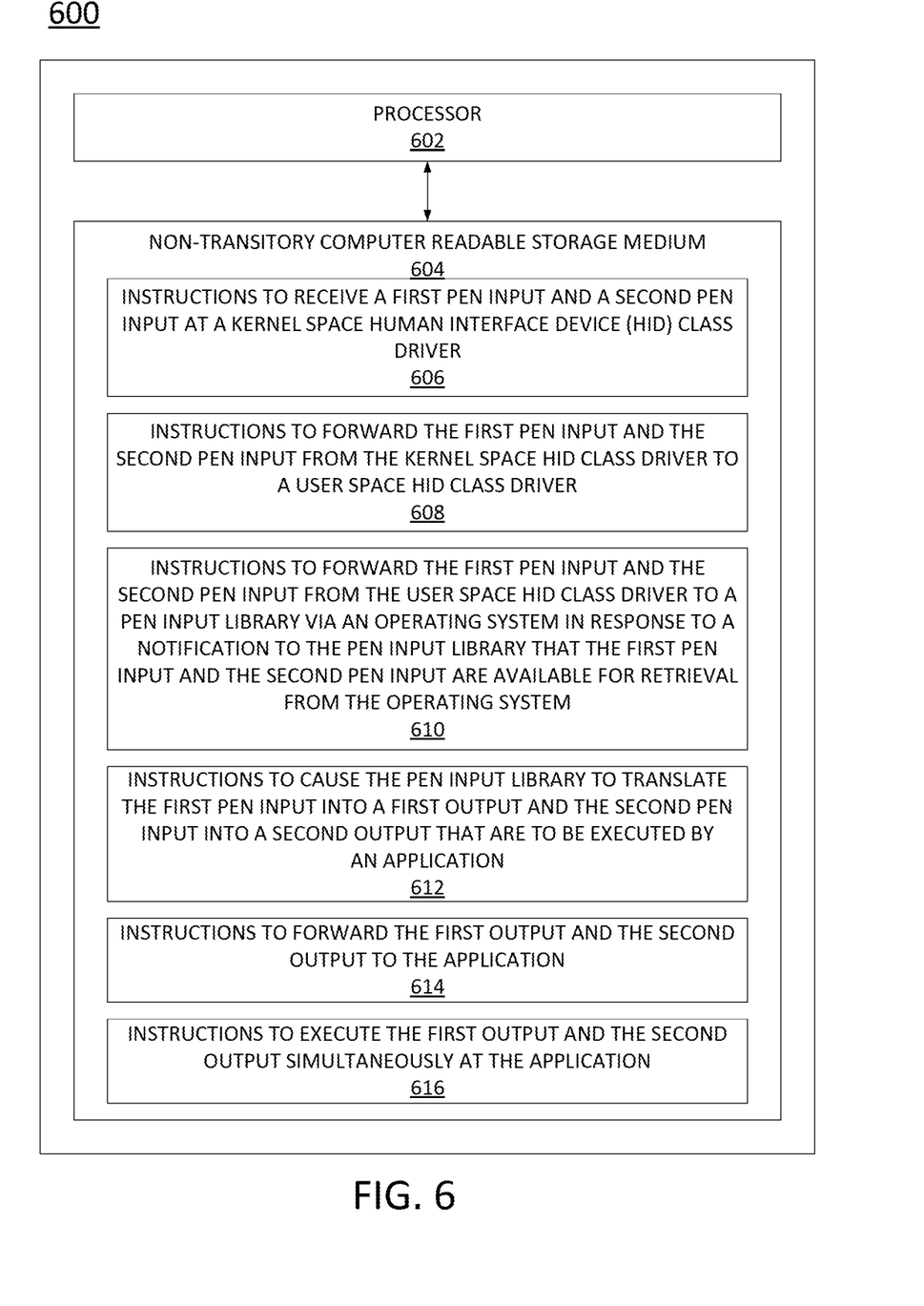
FIG. 6 is a block diagram of another example apparatus of the present disclosure.

FIG. 6 illustrates an example of an apparatus 600. In one example, the apparatus may be the device 100. In one example, the apparatus 600 may include a processor 602 and a non-transitory computer readable storage medium 604. The non-transitory computer readable storage medium 604 may include instructions 606, 608, 610, 612, 614 and 616 that when executed by the processor 602, cause the processor 602 to perform various functions.

In one example, the instructions 606 may include instructions to receive a first pen input and a second pen input at a kernel space human interface device (HID) class driver. The instructions 608 may include instructions to forward the first pen input and the second pen input from the kernel space HID class driver to a user space HID class driver. The instructions 610 may include instructions to forward the first pen input and the second pen input from the user space HID class driver to a pen input library via an operating system in response to a notification to the pen input library that the first pen input and the second pen input are available for retrieval from the operating system. The instructions 612 may include instructions to cause the pen input library to translate the first pen input into a first output and the second pen input into a second output that are to be executed by an application. The instructions 614 may include instructions to forward the first output and the second output to the application. The instructions 616 may include instructions to execute the first output and the second output simultaneously at the application.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method, comprising:
receiving, by a processor, a first pen input from a first pen and a second pen input from a second pen, wherein the first pen and the second pen are interacting with a single display;
translating, by a pen input library, the first pen input into a first output and the second pen input into a second output that are executed by an application; and
sending, by the processor, the first output and the second output to the application, wherein the application executes the first output and the second output simultaneously,
wherein:
the pen input library causes the first pen input and the second pen input to be forwarded from a kernel space to a user space; and
the translating the first pen input and the second pen input includes translating human interface device (HID) events into commands formatted such that the application understands the commands.

2. The method of claim 1, wherein the first pen and the second pen each comprises an electro-mechanical pen device that transmits the first pen input and the second pen input via a respective short range wireless connection or the first pen and the second pen each comprises a mechanical input device that transmits the first pen input and the second pen input via a touch screen interface.

3. The method of claim 1, wherein the first pen input and the second pen input are received at different locations on the single display.

4. The method of claim 1, comprising:
buffering, by the processor, the first pen input and the second pen input to translate the first pen input and the second pen input.

5. The method of claim 1, wherein the translating comprises:
sending, by the processor, an application programming interface (API) call for the first pen input and the second pen input.

6. The method of claim 1, wherein the translating comprises:
calculating, by the processor, missing data for the first pen input and the second pen input.

7. The method of claim 1, wherein the translating comprises:
determining, by the processor, a current state of the first pen input and the second pen input and a state change of the first pen input and the second pen input.

8. The method of claim 1, further comprising:
forwarding the first pen input and the second pen input from a user space to the pen input library via an operating system.

9. The method of claim 1, further comprising:
ignoring commands from a User32.dll corresponding to the first pen input and the second pen input; and
executing commands from the pen input library corresponding to the first pen input and the second pen input.

10. An apparatus, comprising:
a memory comprising instructions;
a processor coupled to the memory, the processor to execute the instructions to:
receive a first pen input and a second pen input at a kernel space human interface device (HID) class driver;
forward the first pen input and the second pen input from the kernel space HID class driver to a user space HID class driver;
forward the first pen input and the second pen input from the user space HID class driver to a pen input library via an operating system in response to a notification to the pen input library that the first pen input and the second pen input are available for retrieval from the operating system;
cause the pen input library to translate the first pen input into a first output and the second pen input into a second output that are to be executed by an application;
forward the first output and the second output to the application; and
execute the first output and the second output simultaneously at the application.

11. The apparatus of claim 10, wherein the pen input library is a part of the application.

12. The apparatus of claim 10, wherein the pen input library is stored in the memory and accessed externally by the application.

13. The apparatus of claim 10, wherein the instructions to cause the pen input library to translate the first pen input and the second pen input comprise instructions to send an application programming interface (API) call for the first pen input and the second pen input.

14. The apparatus of claim 10, comprising:
a touchscreen interface in communication with the processor, wherein the first pen input and the second pen input are received simultaneously via the touchscreen interface.

15. A non-transitory computer-readable storage medium encoded with instructions executable by a processor, the computer-readable storage medium comprising:
instructions to receive a first device input and a second device input, wherein the first device input and the second device input are entered simultaneously via an interface;
instructions to buffer the first device input and the second device input and associate the first device input and the second device input with a first input device and a second input device, respectively;
instructions to cause a pen input library to send an application programming interface (API) call for the first device input and the second device input to translate the first device input into a first output and the second device input into a second output;
instructions to, via the pen input library, associate the first output with the first input device and the second output with the second input device; and
instructions to send the first output for the first input device and the second output for the second input device to an application.

16. The non-transitory computer readable storage medium of claim 15, comprising:
instructions to calculate missing data for the first device input and the second device input.

17. The non-transitory computer readable storage medium of claim 15, comprising:
instructions to determine a current state of the first device input and the second device input and a state change of the first device input and the second device input.

18. The non-transitory computer readable storage medium of claim 15, wherein the pen input library is a dynamic link library that can maintain separate human interface device (HID) event streams for the first pen input and the second pen input.

19. The non-transitory computer readable storage medium of claim 15, wherein the first output and the second output are commands and the pen input library is to receive a human interface device (HID) event, format the HID event into a command, and then forward the command to the application for execution.

\* \* \* \* \*